May 24, 1960 A. S. PATTEN 2,937,681

NUT SECURED TO PLATE BY STAKING

Filed March 7, 1955

INVENTOR.
Alexander S. Patten
BY
Owen & Owen,
ATTORNEYS

United States Patent Office 2,937,681

Patented May 24, 1960

2,937,681

NUT SECURED TO PLATE BY STAKING

Alexander S. Patten, 3884 Indian Road, Toledo, Ohio

Filed Mar. 7, 1955, Ser. No. 492,559

2 Claims. (Cl. 151—41.72)

This invention relates to means for anchoring metal articles, such for instance as nuts, to sheet material, and particularly to such means of the washer type.

Nuts and similar articles anchored to carrying or holding strips to facilitate use in handling are extensively used by various industries and this use has shown that the simplicity and cheapness of attaching the articles to the strips and the strength and durability of the fastening are highly important items that are controlling in the use and sale of the devices.

An object of the invention is the provision of a novel means for attaching nuts or the like to carrying members of thin sheet-like material in a simple, efficient, inexpensive and durable manner whereby to enhance the practicability and commercial value thereof over the means heretofore used for like or similar purposes.

Another object of the invention is the provision of a strong, durable and permanent nut holding means of the class described which eliminates boxing in of the nut by the carrying strip and also welding of the nut thereto, both of which features have been found objectionable from the standpoints of use and manufacture of the devices.

Other objects and advantages of the invention will be apparent from the following detailed description, and from the accompanying drawings illustrating one embodiment thereof, and in which—

Figure 1:
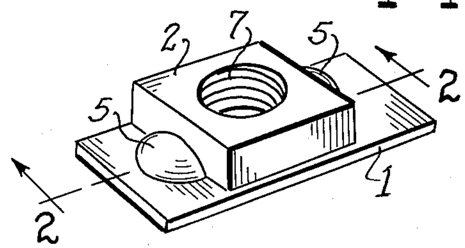
Fig. 1 is a perspective view of a nut and carrying member therefor secured together in a manner embodying the invention.
Figure 2:
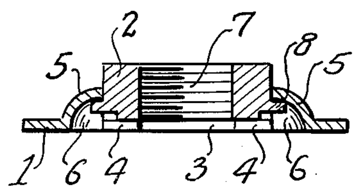
Fig. 2 is a section thereof on the line 2—2 in Fig. 1.
Figure 3:
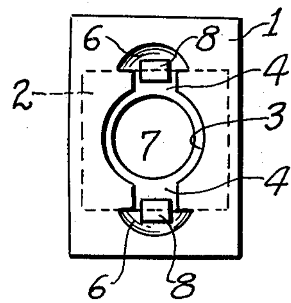
Fig. 3 is a bottom plan view thereof.

Referring to Figs. 1 to 5 of the drawings, 1 designates the holding member and 2 the article that is attached thereto, and which article is illustrated in the present instance as a standard type nut. The member 1 comprises a short length or strip of stiff ribbon-like material, such for instance as sheet steel, plastic or the like, and this is stamped or otherwise provided centrally of its side edges and in suitable position intermediate its ends with an opening 3 slightly larger in diameter than the hole 7 of the nut 2 to be attached. This opening 3, in the present instance, is provided in diametrically opposed side walls, that are spaced lengthwise of the strip 1, with radial recesses 4, 4 of less width than the opening diameter and extending outwardly to cross lines which register with respective side edges of a nut 2 placed on the strip in centered relation to the opening, as shown in the drawings.

The outer end edge walls of the recesses 4 are struck up or otherwise suitably formed to provide, on the top or nut attaching side of the member 1, bosses or protuberances 5 defining or forming recesses 6 that open both downwardly from the member and outwardly thereover in opposing facing relation. The free or inner edges of the bosses 5 are disposed in vertical transverse planes normal to the strip surface, which planes substantially coincide with the adjacent opposing sides of a nut 2 therebetween so as to prevent movement of the nut lengthwise of the holding member.

Figure 4:
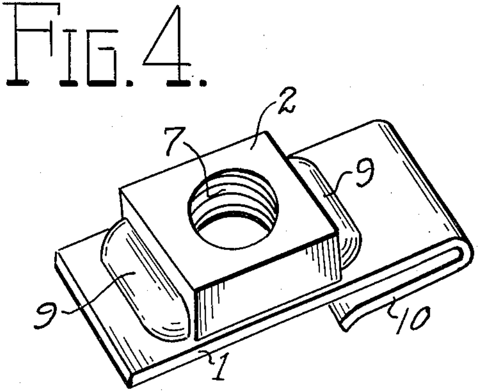
Fig. 4 is a view similar to Fig. 1, showing a slightly modified form of the nut holding means, and also showing the holding member as provided with a mounting clip at one end.
Figure 5:
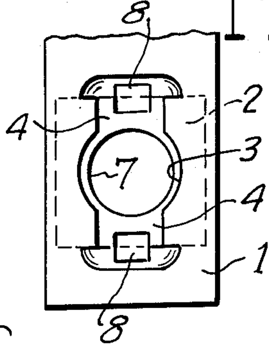
Fig. 5 is a reduced bottom plan of the nut and holding member shown in Fig. 4, with the clip end of the holding member broken away.

When a nut has been positioned on a member 1 between a pair of bosses 5 with its opening 7 centered with the member opening 3, the inner or bottom edges of the nut which register with the respective boss recesses 6 are struck or upset in any suitable manner through the recesses 4 to project small anchoring or staking lugs 8 therefrom into the respective boss recesses 6. These lugs engage the inner wall surfaces of the bosses and cooperate therewith to firmly hold the nut against removal from the carrying member. If desired, the anchoring bosses may be made longer than the lugs 8 transversely of the member 1, as shown at 9 in Figs. 4 and 5, to permit limited transverse adjustment of the nut relative to the member and thus facilitate registering the nut with an associated bolt shank should the member 1 be fixedly attached to a part on which mounted. To facilitate mounting of a holding member 1 on a part with which it may be associated, it may, if desired, be provided at one end with a turned back tongue 10, as shown in Fig. 4, as is common in nut holding clips now in use.

It is apparent that the manufacture of article holding means of this character and the securing of articles therein may be accomplished in a simple, rapid and economical manner by operating on a continuous strip of sheet metal, plastic or the like, to successively form the openings 3 with recesses 4 therein and striking up the bosses 5, positioning the nuts or other articles thereon between the bosses, then upsetting opposing edges of the article within the boss recesses to firmly anchor the article to the holding member, and finally severing the strip between the attached articles to provide separate duplicate units.

Figure 6:
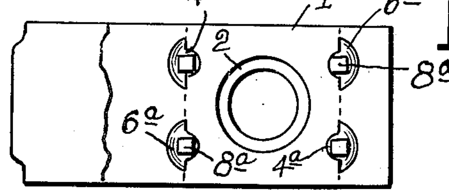
Fig. 6 is a view similar to Fig. 5 showing a modification of the nut holding member and staking means.

In the modification shown in Fig. 6, the nut holding member $1^a$ is provided at each of two opposing sides of the nut with two struck-up bosses forming inwardly facing recesses $6^a$ each receiving a registering staking lug $8^a$ of the nut. The radial recesses 4 shown in the first form are eliminated and in lieu thereof the member $1^a$ is provided inwardly from the boss of each recess $6^a$ with a small supplemental opening or recess $4^a$. These recesses $4^a$ expose the respective adjacent edges of a nut mounted on the member $1^a$ between boss recesses $6^a$ and permit the insertion of a staking tool to form the respective staking lugs $8^a$ on the nut.

While I have particularly described the article to be attached to a strip or conveying member 1 as a nut, it is apparent that various other articles may be used in place of a nut and attached to the strip in the same manner.

I wish it understood that my invention is not limited to any specific construction, arrangement or form of the parts, as it is capable of numerous modifications and changes without departing from the spirit of the claims.

I claim:

1. A fastener including an elongate relatively narrow sheet metal strip having an aperture therein, said strip having a pair of slits extending transversely of the strip on opposite sides of the aperture therein and terminating in inwardly spaced relationship with respect to the longitudinal edges of the strip, portions of the strip longitudinally outwardly of the slits being bent upwardly to form a pair of dome-like projections each of which terminates at its inner edge in a plane extending generally perpendicular to the plane of said strip, and a polygonal nut having opposed walls and an internally threaded aperture, said nut engaging one face of said strip at a position intermediate the slits in said strip with the internally threaded aperture in the nut aligned with the aperture in said strip, said edges of said dome-like projections being spaced apart in the direction of the length of said strip substantially the same distance as the distance between said opposed walls of said nut and engaging said opposed walls of said nut to prevent any substantial relative rotation between said nut and said strip, the aperture in said strip extending outwardly in the direction of the length of said strip on opposite sides of the aperture in the nut and communicating with the space beneath the dome-like projections, said nut having integral staked portions aligned with the aperture in said strip and partially sheared from the nut so as to project outwardly from the central portions of said opposed walls into the space beneath said dome-like projections to engage the underside of said dome-like projections and retain said nut in assembled relationship with said strip.

2. In a washer type fastening means, the combination of a ribbon-like material which forms a flat mounting plate and washer member, a lengthwise elongated opening in said flat mounting plate, a radial locating cup having its outer edge perpendicular and square with the flat mounting plate, at each end of said elongated opening, said radial cups having a greater width than that of said elongated opening, a commercial nut seating flat against said flat mounting plate, two perpendicular edges of said commercial nut in engagement with said perpendicular square edges of said radial locating cups, the elongated opening in said flat mounting plate being in register with an opening in said commercial nut, said edges of said commercial nut having small lugs cut from and drawn into said radial cups to engage the underside of said radial cups and retain said nut in position between said mounting plate and said radial cups.

References Cited in the file of this patent

UNITED STATES PATENTS

| | | |
|---|---|---|
| 1,014,684 | Weygand | Jan. 16, 1912 |
| 1,272,919 | Crawford | July 16, 1918 |
| 1,852,978 | Mitchel | Apr. 5, 1932 |
| 1,872,385 | Andren | Aug. 16, 1932 |
| 2,335,593 | Howe | Nov. 30, 1943 |
| 2,631,634 | Tinnerman | Mar. 17, 1953 |

FOREIGN PATENTS

| | | |
|---|---|---|
| 503,900 | Great Britain | Apr. 17, 1939 |